(12) United States Patent
Sedarat et al.

(10) Patent No.: US 12,483,439 B1
(45) Date of Patent: Nov. 25, 2025

(54) NETWORK LAYER DEVICE WITH EXTENDED TRANSMISSION RANGE

(71) Applicant: Ethernovia Inc., San Jose, CA (US)

(72) Inventors: Hossein Sedarat, San Jose, CA (US); Ramin Shirani, Morgan Hill, CA (US); Christopher Mash, Harpenden (GB); Roy T. Myers, Jr., Morgan City, CA (US); Darren S. Engelkemier, Menlo Park, CA (US)

(73) Assignee: Ethernovia Inc., San Jose, CA (US)

( * ) Notice: Subject to any disclaimer, the term of this patent is extended or adjusted under 35 U.S.C. 154(b) by 148 days.

(21) Appl. No.: 18/179,008

(22) Filed: Mar. 6, 2023

Related U.S. Application Data

(60) Provisional application No. 63/268,982, filed on Mar. 8, 2022.

(51) Int. Cl.
  *H04L 12/40* (2006.01)

(52) U.S. Cl.
  CPC .. *H04L 12/40136* (2013.01); *H04L 12/40065* (2013.01); *H04L 2012/40273* (2013.01)

(58) Field of Classification Search
  CPC ......... H04L 12/40136; H04L 12/40065; H04L 2012/40273
  See application file for complete search history.

(56) References Cited

U.S. PATENT DOCUMENTS

| | | | |
|---|---|---|---|
| 6,611,537 B1 * | 8/2003 | Edens | H04N 21/4363 375/E7.274 |
| 6,993,673 B2 * | 1/2006 | Greiss | H04L 25/0307 375/233 |
| 8,270,389 B2 * | 9/2012 | Parnaby | H04L 12/12 370/324 |
| 10,644,834 B1 * | 5/2020 | McClellan | H03M 13/6306 |
| 2004/0218568 A1 * | 11/2004 | Goodall | H04L 1/206 370/332 |
| 2015/0237145 A1 * | 8/2015 | Koseki | H04L 67/56 709/225 |
| 2016/0187974 A1 * | 6/2016 | Mallinson | G06F 3/011 463/32 |
| 2017/0302406 A1 * | 10/2017 | Tanaka | H04B 10/60 |
| 2019/0372822 A1 * | 12/2019 | Woodsum | H04L 27/3488 |
| 2022/0109583 A1 * | 4/2022 | Leung | G06F 1/3296 |

* cited by examiner

*Primary Examiner* — Luat Phung
(74) *Attorney, Agent, or Firm* — Schwegman, Lundberg & Woessner, P.A.

(57) ABSTRACT

Various embodiments provide for a network layer device, such as a physical layer network device based on an IEEE 802.x network standard, with extended transmission range. In particular, some embodiments enable a network layer device, that is designed to support network data communication in accordance with a known network standard and that comprises an echo cancellation functional component and an equalization functional component designed to support a nominal data rate defined by the known network standard, to communicate data at an alternative data rate that is lower than the nominal data rate and which may or may not be defined by the known network standard.

20 Claims, 4 Drawing Sheets

NETWORK LAYER DEVICE WITH EXTENDED TRANSMISSION RANGE

CROSS-REFERENCE TO RELATED APPLICATION

This application claims priority to and the benefit of U.S. Provisional Patent Application No. 63/268,982, filed on Mar. 8, 2022, which is incorporated herein by reference.

TECHNICAL FIELD

Embodiments described herein relate to data communications and, more particularly, to systems, methods, devices, and instructions for a network layer device, such as a physical layer network device based on an IEEE 802.x network standard, with extended transmission range.

BACKGROUND

Network standards, such as IEEE 802.3ch and IEEE 802.3 bp network standards, typically specify support for network communications at defined data rates (e.g., measured in Mbps or Gbps) over specified data transmission medium (or transmission medium), such as a physical cable, for a specified maximum distance (e.g., maximum distance over the physical cable). For example, IEEE 802.3ch supports data communication rates of 10 Gbps, 5 Gbps, and 2.5 Gbps, over one pair of wires (a single twisted-pair wire) for a maximum distance of 15 m. In contrast, IEEE 802.3 bp support a data communication rate of 1 Gbps, over one pair of wires for a maximum distance of 15 m.

Both IEEE 802.3ch and IEEE 802.3 bp represent examples of Ethernet network standards that use a single twisted-pair and that are intended for use in automotive applications, such as camera sensors or display devices of an automobile that are connected by way of an Ethernet data communications network. For instance, a camera sensor being used by an automobile can send multi-gigabits/s of data (e.g., to a processor of the automobile) over an Ethernet data communications network that uses a twisted-pair wire.

In order to support a particular network standard, a network device usually includes functional components, such as equalization functional components (e.g., equalizers or equalization engine), echo cancellation functional components (e.g., echo cancellers), signal modulators (e.g., PAM-3 or PAM-4 modulator), signal demodulators (e.g., PAM-3 or PAM-4 demodulator), and the like, with sufficient capabilities to meet requirements of the particular network standard-requirements that ensure that the network device can achieve the data rates at maximal distances in accordance with the particular network standard. Depending on the network standard, requirements for the functional components can represent minimum or exact requirements.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
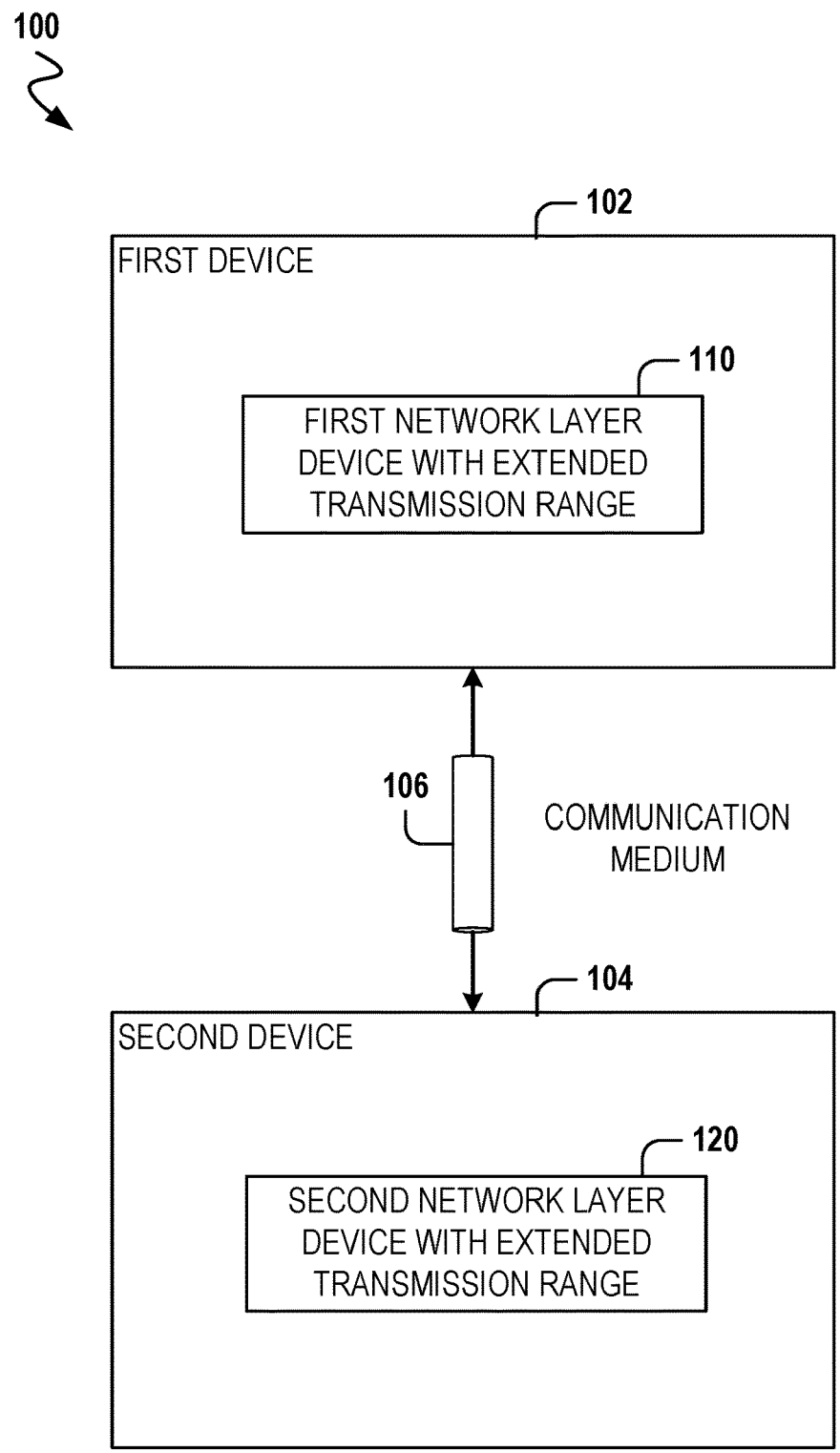
FIG. 1 is a block diagram illustrating an example system comprising a first device and a second device that include network layers devices with extended transmission range, in accordance with some embodiments.

Various embodiments provide for a network layer device, such as a physical layer network device based on an IEEE 802.3x network standard, with extended transmission range, which can be used in such applications as data network communications between sensors (e.g., camera, accelerometer, radar, etc.) and computing equipment within vehicles (e.g., in smart and autonomous cars), or data network communications between a media server (e.g., storing movies or music) and a display device (e.g., in the passenger compartment of a vehicle). In particular, some embodiments enable a network layer device, that is designed to support network data communication in accordance with a known network standard and that comprises an echo cancellation functional component (e.g., echo canceller) and an equalization functional component (e.g., equalizer) designed to support a nominal data rate defined by the known network standard, to communicate data at an alternative data rate that is lower than the nominal data rate and that is either not defined by the known network standard, or used in an extended operating mode beyond the specifications of a lower-data rate network standard. In this way, various embodiments can reuse or leverage the power or capability of the echo cancellation functional component (e.g., to cancel echo of a transmitted signal) and the equalization functional component (e.g., to compensate for ISI), both designed to support a particular data rate of a known network standard, to a lower data rate that either is not defined by the known network standard, or used beyond the specified operating limits of a known lower-data rate network standard (e.g. reach, cable type, etc.). For some embodiments, a network layer device provides data communication at the alternative (e.g., lower) data rate by including one or more additional functional components that facilitate the lower data rate communication, such as a signal generation functional component (e.g., signal generator) that uses a clock frequency (e.g., symbol rate) and signal modulation scheme (e.g., by a signal modulator) that enables generation of a transmit data signal carrying data frames at the lower data rate. For instance, a network layer device described herein can comprise a signal generator that enables generation of a transmit data signal that carries data frames at a nominal data rate of 10 Gbps (e.g., in accordance with IEEE 802.3ch) using a clock frequency of 5.625 GHz and a signal modulation of Pulse Amplitude Modulation 4-level (PAM4), and that also enables generation of a transmit data signal that carries data frames at an alternative data rate of 1 Gbps (e.g., which are not defined by IEEE 802.3ch) using a clock frequency of 750 MHZ, a signal modulation of Pulse Amplitude Modulation 3-level (PAM3), proper data frame generation (bit scrambling and forward error correcting code, etc.). Another additional functional component included by an embodiment can comprise a data frame generation functional component designed to support generation of the first set of data frames for transmission at the nominal data rate in accordance with the known network standard, and to support generation of the second set of data frames for transmission at the alternative data rate (which may or may not be supported by the known network standard).

By use of various embodiments, a network layer device can achieve longer transmission ranges for specific data rates than traditional network layer devices that are specifically designed to support those same data rates in accordance with a network standard that defines those same data rates. Stated another way, with respect to a network layer device, the power and capability of an echo cancellation functional component and an equalization functional component designed for a given data rate in accordance with a known network standard can be used (e.g., reused) to facilitate communication at a lower data rate not defined by the known network standard but at an extended transmission range (e.g., a further range than possible by other network standards that defines the lower data rate). Accordingly, the extra hardware machinery added to the echo cancellation functional component and the equalization functional component of an embodiment to support higher data rates (e.g., a nominal data rate) can be used to extend a traditional transmission range achieved for when the echo cancellation functional component and the equalization functional component are used for lower data rates (e.g., an alternative data rate). For instance, a network layer device of an embodiment that is designed to support data communications in accordance with IEEE 802.2ch, and that comprises an echo cancellation functional component and an equalization functional component designed to support a 10 Gbps (e.g., 10G) data rate as defined by IEEE 802.2ch, can comprise one or more additional functional components (e.g., signal modulators/demodulator, error-correction, and the like) to enable communication at a data rate of 1 Gbps (e.g., 1G) at a maximum data transmission range of 100 m, or enable communication at a data rate of 2.5 Gbps (e.g., 2.5G) at a maximum data transmission range of 60 m, over a data transmission medium (e.g. IEEE 802.3ch cable, or IEEE 802.3 bp Type-A or Type-B cable). This can represent an example of an embodiment rescaling (e.g., reconfiguring) a 10 Gbps (e.g., 10G) physical layer (PHY) network device to operate as a 1 Gbps (e.g., 1G) PHY network device or 2.5 Gbps (e.g., 2.5G) PHY network device.

As used herein, a network layer device can comprise or implement one or more layers of a network device including, but not limited to, layer one (e.g., physical (PHY) layer), layer two (e.g., media access control (MAC) layer), or both. As used herein, a node or a node device on a data communication network can comprise a device (e.g., with a hardware processor) coupled to the data communication network and comprising a network layer device that facilities data communication with extended transmission range as described herein on the data communication network. Some embodiments described herein use Ethernet (e.g., 802.3 bp) cabling standards, Ethernet signaling (e.g., IEEE802.3ch) standards, Ethernet data framing and addressing (e.g., IEEE802.1) standards, or some combination thereof.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 comprises a first device 102 and a second device 104 that include network layers devices with extended transmission range, in accordance with some embodiments. Depending on the embodiment, the first device 102 can be implemented (at least in part) or can be included by machine 400 of FIG. 4, and the second device 104 can be implemented (at least in part) or can be included by machine 400 of FIG. 4. As shown, a communication medium 106 (e.g., data transmission medium) operatively couples the first device 102 to the second device 104, where the communication medium 106 can support a data link in accordance with an existing network standard (e.g., an Ethernet standard). The communication medium 106 can comprise a wire (e.g., twisted pair) that permits transmission of an analog signal. As also shown, the first device 102 comprises a first network layer device with extended transmission range 110 (hereafter, the first network layer device 110), and the second device 104 comprises a second network layer device with extended transmission range 120 (hereafter, the first network layer device 120). For various embodiments, each of the first network layer device 110 and the second network layer device 120 implements layer one of a network (e.g., PHY layer), layer two of a network (e.g., MAC layer), or both for its respective device (102 and 104, respectively). For instance, the first network layer device 110 represents one or more components of the first device 102 that implement or enable a MAC layer of a network stack of the first device 102, and one or more components of the first device 102 that implement or enable a PHY layer of a network stack of the first device 102. Similarly, the second network layer device 120 represents one or more components of the second device 104 that implement or enable a MAC layer of a network stack of the second device 104, and one or more components of the second device 104 that implement or enable a PHY layer of a network stack of the second device 104. Each of the first network layer device 110 and the second network layer device 120 implement one or more methodologies described herein with respect to various embodiments.

According to some embodiments, the first device 102 represents a sensor of an automobile, such as a camera sensor that transmits video data, and the second device 104 represents a processing device of the automobile, such as an aggregator device that aggregates video data or a graphics processing device (e.g., with a graphics processing unit (GPU)) that process video data (e.g., for image recognition). Additionally, for some embodiments, the first device 102 represents a media source device of an automobile, such as a media server that provides data for one or more media items (e.g., video or audio items), and the second device 104 represents a media player device of the automobile, such as a display device that can display video data streamed from the media server.

For some embodiments, the first network layer device 110 comprises an echo cancellation functional component (e.g., echo canceller), an equalization functional component (e.g., equalization engine or equalizer), and a signal generation functional component. In accordance with various embodiments, the echo cancellation functional component is configured to cancel echo of a transmitted data signal from a received data signal received from the second network layer device 120 over the communication medium 106, where the transmitted data signal is transmitted from the first network layer device 110 to the second network layer device 120 over the communication medium, and where the echo cancellation functional component is designed to support a nominal data rate (e.g., 10 Gbps) defined by a known network standard (e.g., IEEE 802.3ch). For various embodiments, the equalization functional component is configured to at least reduce inter-symbol interference (ISI) present in the received data signal, and the equalization functional component is designed to support the nominal data rate defined by the known network standard. For some embodiments, the signal generation functional component is designed to support generation of a first transmit data signal for transmission of a first set of data frames at the nominal data rate in accordance with the known network standard, and to support generation of a second transmit data signal for transmission of a second set of data frames at an alternative data rate (e.g., 1 Gbps or 2.5 Gbps) over a potentially extended range. The alternate data rate or the extended range (or both) may not be supported (e.g., not defined or specified) by the known network standard. The signal generation functional component can generate the first transmit data signal based on a first clock frequency (e.g., 5.625 GHZ) and using a first signal modulation scheme (e.g., PAM4), where the first clock frequency and the first signal modulation scheme being specified for the nominal data rate by the known network standard. Additionally, the signal generation functional component can generate the second transmit data signal based on a second clock frequency (e.g., 750 MHz) and using a second signal modulation scheme (e.g., PAM3), where the second clock frequency is different from the first clock frequency and the second signal modulation scheme being different from the first signal modulation scheme.

For some embodiments, the second clock frequency (e.g., 750 MHz) is slower than the first clock frequency (e.g., 5.625 GHZ). The first signal modulation scheme can be PAM4, and the second signal modulation scheme can be PAM3. The nominal data rate can be 10 Gbps, and the alternative data rate can be 1 Gbps. As described herein, for some embodiments, the known network standard comprises IEEE 802.3ch. Accordingly, the data transmission medium can comprise a cable in accordance with IEEE 802.3ch or IEEE 802.3 bp. For instance, the data transmission medium can comprise a cable in accordance with IEEE 802.3ch, where the nominal data rate is 10 Gbps and the alternative data rate is 1 Gbps (e.g., at a maximum transmission range of 100 m). The data transmission medium can comprise a cable in accordance with IEEE 802.3ch, where the nominal data rate is 5 Gbps and the alternative data rate is 1 Gbps (e.g., at a maximum transmission range of 50 m). The data transmission medium can comprise a cable in accordance with IEEE 802.3ch, where the nominal data rate is 2.5 Gbps and the alternative data rate is 1 Gbps (e.g., at a maximum transmission range of 25 m).

In another instance, the data transmission medium can comprise a cable in accordance with IEEE 802.3 bp, where the nominal data rate is 10 Gbps and the alternative data rate is 2.5 Gbps (e.g., at a maximum transmission range of 60 m). The data transmission medium can comprise a cable in accordance with IEEE 802.3 bp, where the nominal data rate is 10 Gbps and the alternative data rate is 5 Gbps (e.g., at a maximum transmission range of 30 m). The data transmission medium can comprise a cable in accordance with IEEE 802.3 bp, where the nominal data rate is 5 Gbps and the alternative data rate is 2.5 Gbps (e.g., at a maximum transmission range of 30 m).

For some embodiments, the first network layer device 110 comprises a data frame generation functional component designed to support generation of the first set of data frames for transmission at the nominal data rate in accordance with the known network standard, and to support generation of the second set of data frames for transmission at the alternative data rate (which may or may not be supported by the known network standard).

According to some embodiments, the second network layer device 120 is similar to the first network layer device 110 and, as such, can facilitate data communications with the first network layer device 110 at a similar data rates and with similar transmission ranges as the first network layer device 110.

Figure 2:
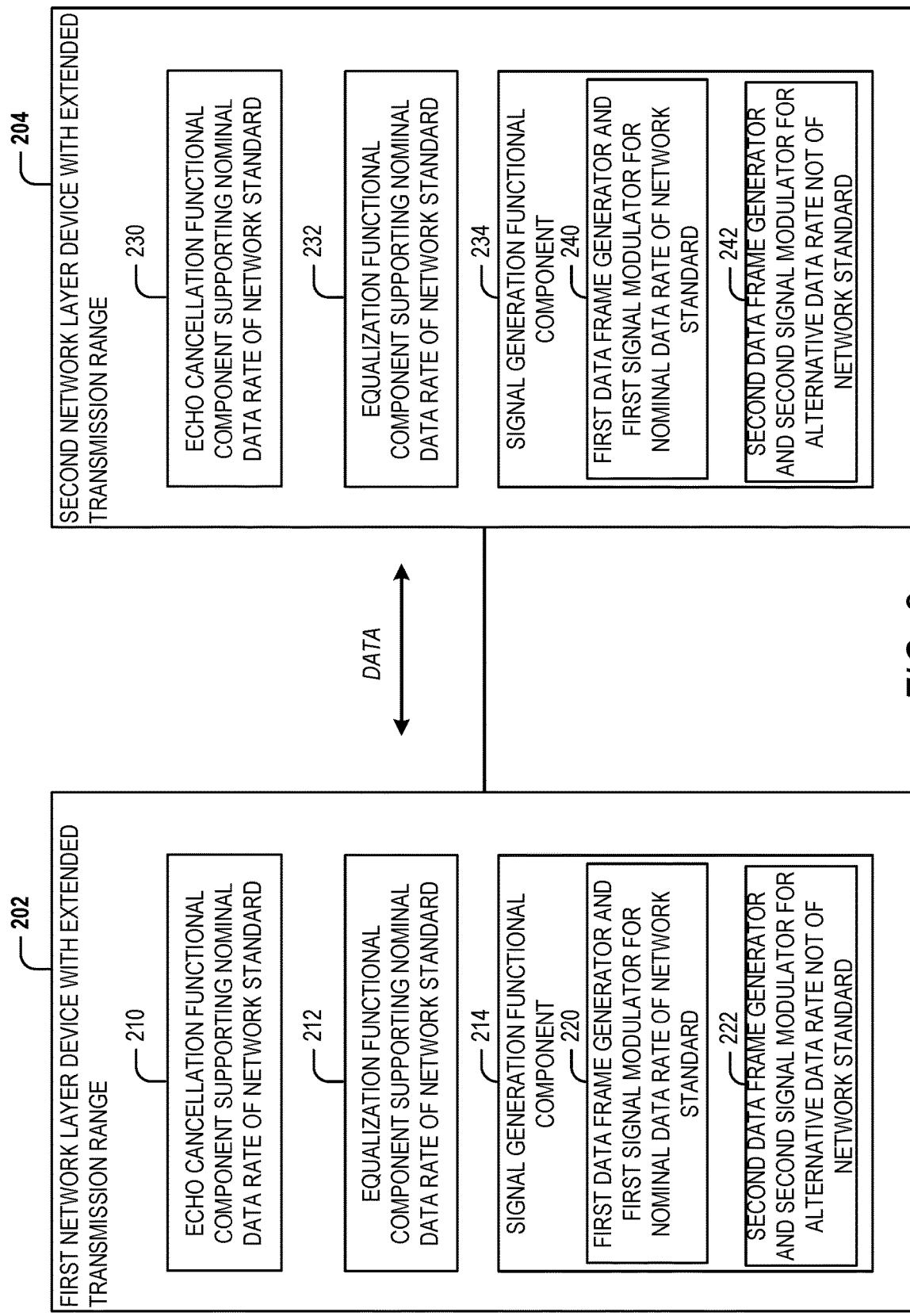
FIG. 2 is a block diagram illustrating example network layer devices with extended transmission ranges, in accordance with some embodiments.

FIG. 2 is a block diagram illustrating example network layer devices with extended transmission ranges, in accordance with some embodiments. As shown, a first network layer device with extended transmission range 202 (hereafter, the first network layer device 202) is operatively coupled to a second network layer device with extended transmission range 204 (hereafter, the second network layer device 204). The first network layer device 202 can represent the first network layer device 110 of FIG. 1, and the second network layer device 204 can represent the second network layer device 120 of FIG. 1. The first network layer device 202 comprises an echo cancellation functional component 210 and an equalization functional component 212, each of which support a nominal data rate defined by a known network standard (e.g., support 10 Gbps in accordance with IEEE 802.3ch). Similarly, the second network layer device 202 comprises an echo cancellation functional component 230 and an equalization functional component 232, each of which support a nominal data rate defined by a known network standard (e.g., support 10 Gbps in accordance with IEEE 802.3ch).

Each of the echo cancellation functional components 210, 230 is configured to cancel echo of a transmitted data signal from a data signal received from the other network layer device over a data transmission medium. Each of the echo cancellation functional components 210, 230 has sufficient dynamic range, cancellation span, and computational power to accommodate and cover the echo (e.g., reflection) of the transmitted data signal of the cable between the first and the second network layer devices 202, 204. For some embodiments, an echo cancellation functional component that supports a nominal data rate at a nominal maximum cable length ($L_0$), over a cable with a nominal propagation delay time per unit length of the cable ($T_0$), and using a nominal clock frequency ($C_0$) in accordance with a known network standard (e.g., IEEE 802.3ch), can support a maximal cable length (L) at an alternative data rate, can be calculated by the following Equation 1.

$$L = L_0 \cdot \frac{C_0 \cdot T_0}{C \cdot T},$$

where $L_0$ represents the nominal maximum cable length as defined by the known network standard for the nominal data rate, $T_0$ represents the nominal propagation delay time per unit length as defined by the known network standard, $C_0$ represents the nominal clock frequency as defined by the known network standard for the nominal data rate, L represents the maximum cable length for the alternative data rate, T represents the propagation delay time for the alternative data rate, and C represents the clock frequency used for generating a transmit signal for the alternative data rate. For some embodiments, $T_0$ and T are similar to each other Each of the equalization functional components 212, 232 is configured to at least reduce inter-symbol interference present in data signal received over a data transmission medium. According to some embodiments, the upper limit of equalization of an equalization functional component is determined by Salz SNR, which is a function of the insertion loss of channel and noise sources. The ISI-cancellation power of the equalization functional component that is designed for high data rate system (e.g. 10 Gbps) can be used by an embodiment to support lower data rate communication (e.g. 1 Gbps or 2.5 Gbps) over extended range of cable or over higher-loss cable types. When operating at the alternative data rate, the limit of loss for each cable type can be extended beyond the frequency range specified by the known network standard.

The first network layer device 202 comprises a signal generation functional component 214 that includes a first data frame generator and a first signal modulator 220 (hereafter, the first generator and modulator 220) with a first symbol transmission rate (e.g. baud-rate) for supporting a nominal data rate defined by the known network standard, and a second data frame generator and a second signal modulator 222 (hereafter, the second generator and modulator 222) with a second symbol transmission rate (e.g. baud-rate) for supporting an alternative data rate not defined by the known network standard. In particular, the first generator and modulator 220 supports generation of a first transmit data signal for transmission of a first set of data frames at the nominal data rate in accordance with the known network standard, where the first transmit data signal is generated based on a first clock frequency and using a first data frame generation and/or signal modulation scheme, and where the first clock frequency and the first signal modulation scheme is specified for the nominal data rate by the known network standard. The second generator and modulator 222 supports generation of a second transmit data signal for transmission of a second set of data frames at an alternative data rate (e.g., which may or may not be supported by the known network standard), where the alternative data rate is lower than the nominal data rate, where the second transmit data signal is generated based on a second clock frequency and using a second data frame generation and/or signal modulation scheme, where the second clock frequency is different from the first clock frequency, and where the second data frame generation and/or signal modulation scheme can be different from the first data frame generation and/or signal modulation scheme.

Likewise, the second network layer device 202 comprises a signal generation functional component 234 that includes a first data frame generator and a first signal modulator 240 (hereafter, the first generator and modulator 240) for supporting a nominal data rate defined by the known network standard, and a second data frame generator and a second signal modulator 242 (hereafter, the second generator and modulator 242) for supporting an alternative data rate (e.g., which may or may not be defined by the known network standard). According to some embodiments, the first generator and modulator 240 and the second data frame generator and the second generator and modulator 242 are respectively similar to the first generator and modulator 220 and the second generator and modulator 222.

Figure 3:
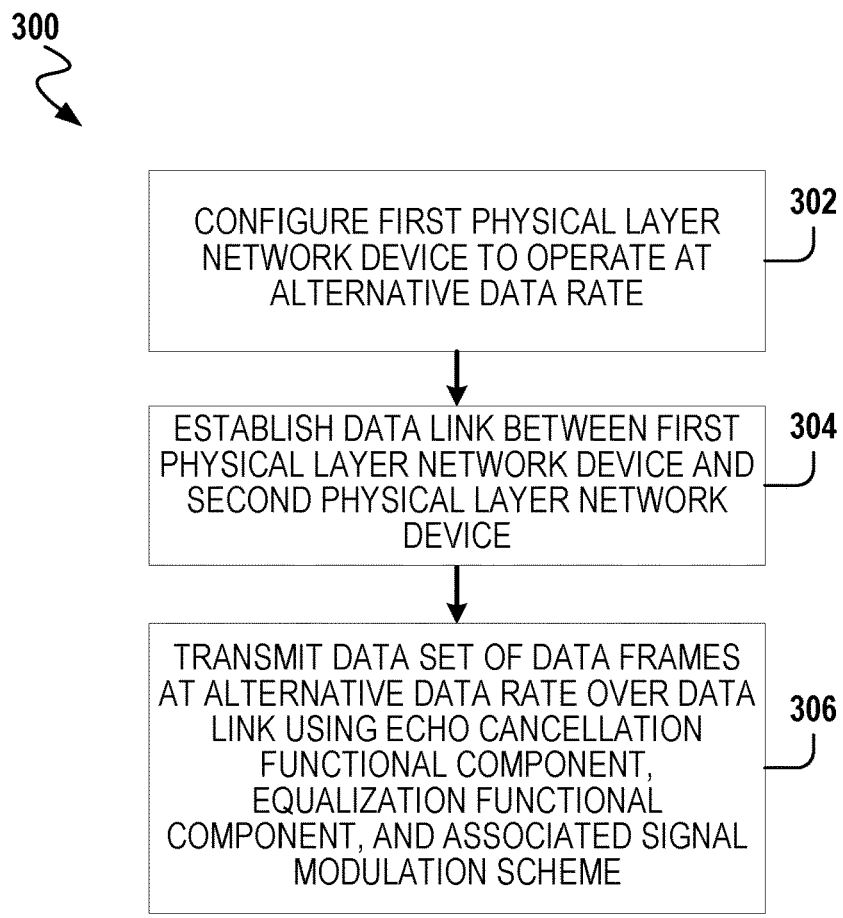
FIG. 3 is a flowchart illustrating an example method for a network layer device with extended transmission range, in accordance with some embodiments.

FIG. 3 is a flowchart illustrating an example method for a network layer device with extended transmission range, in accordance with some embodiments. It will be understood that example methods described herein may be performed by various circuit components, including, for example, addition circuits, comparators, slicers, digital-to-analog convertors (DAC), analog-to-digital convertors (ADC), delay components, feed-forward equalizers, echo cancellers, crosstalk cancellers, precoders, DFEs and the like. For instance, the methods 300 may be performed at least in part by the first network layer device 110 of FIG. 1, the second network layer device 120 of FIG. 1, or both. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 3, at operation 302, a first network layer device (e.g., 110 or 202) is configured to operate at an alternative data rate. For some embodiment, the first network layer device can be configured to operate at a nominal data rate in accordance with a known network standard (e.g., IEEE 802.3ch), and can be configured to operate at an alternative data rate not defined by the known network standard. At operation 304, the first network layer device establishes a data link between the first network layer device (e.g., 110 or 202) and a second network layer device (e.g., 120 or 204) over a data transmission medium, where data is communicated over the data link in a first direction from the first network layer device to the second network layer device is at the alterative data rate. At operation 306, the first network layer device transmits the second set of data frames over the data link using the echo cancellation functional component of the first network layer device, the equalization functional component of the first network layer device, and the second signal modulation scheme associated with the alternative data rate.

Figure 4:
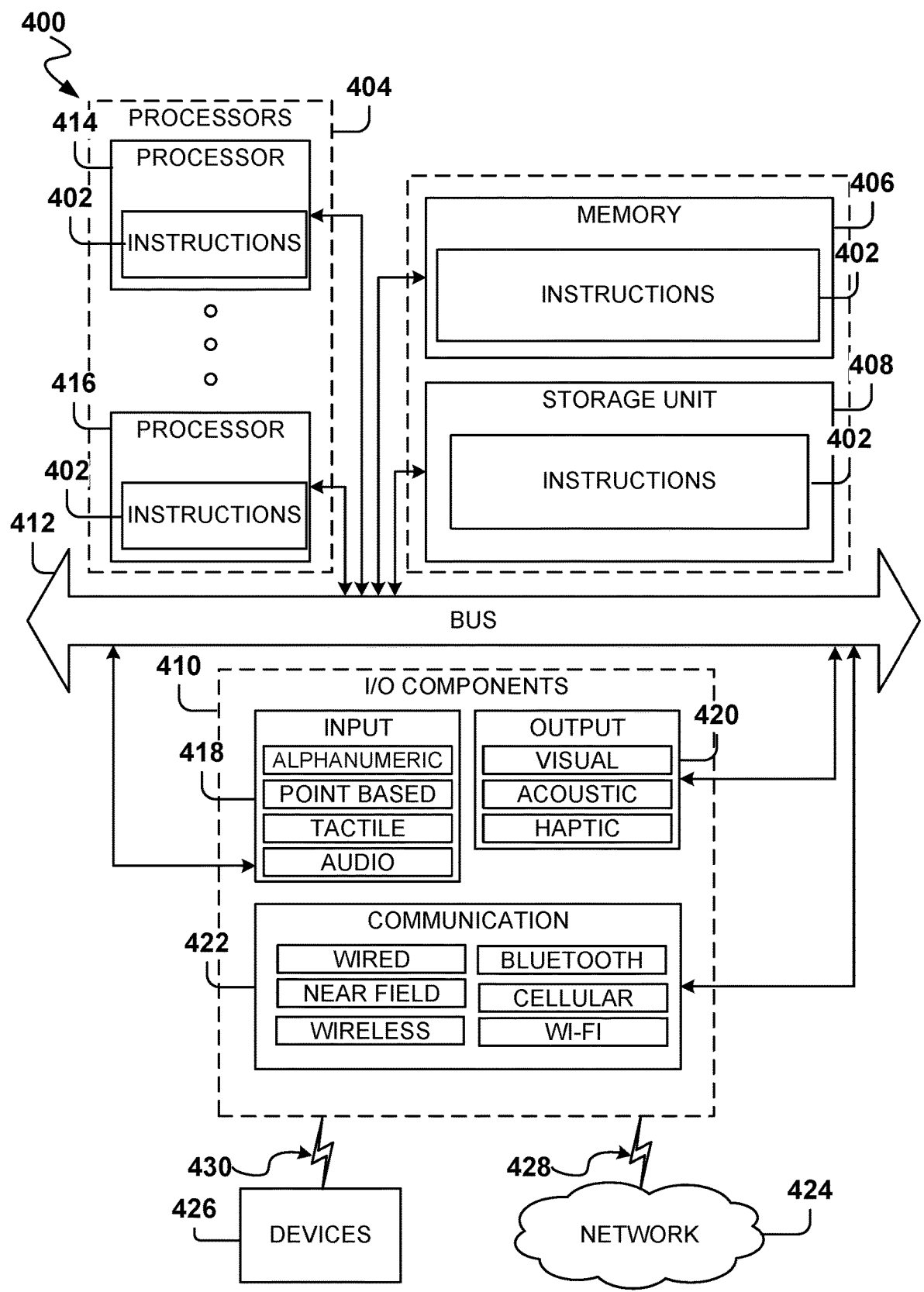
FIG. 4 is a block diagram illustrating components of an example machine that can use one or more embodiments discussed herein.

FIG. 4 is a block diagram illustrating components of an example machine 400 that can use one or more embodiments discussed herein. Specifically, FIG. 4 shows a diagrammatic representation of the machine 400 in the example form of a system, within which instructions 402 (e.g., software, a program, an application, an applet, an app, a driver, or other executable code) for causing the machine 400 to perform one or more operations that may make use of one or more of the methodologies discussed herein. For example, the instructions 402 include executable code that causes the machine 400 to execute one or more operations that cause a network layer device of the machine 400 (e.g., embodied by communication components 422) to perform the method 300. The machine 400 may be coupled (e.g., networked) to other machines. Depending on the embodiment, the machine 400 can implement at least some portion of the first device 102 or the second device 104.

By way of non-limiting example, the machine 400 may comprise or correspond to a television, a computer (e.g., a server computer, a client computer, a personal computer (PC), a tablet computer, a laptop computer, or a netbook), a personal digital assistant (PDA), a smart phone, a mobile device, an automotive electronic control unit (ECU), or any machine capable of executing the instructions 402, sequentially or otherwise, that specify actions to be taken by the machine 400. Further, while only a single machine 400 is illustrated, the term "machine" shall also be taken to include a collection of machines 400 that individually or jointly execute the instructions 402.

The machine 400 may include processors 404, memory 406, a storage unit 408, and input/output (I/O) components 410, which may be configured to communicate with each other such as via a bus 412. In some embodiments, the processors 404 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 414 and a processor 416 that may execute the instructions 402. The term "processor" is intended to include multi-core processors 404 that may comprise two or more independent processors (sometimes referred to as "cores") that may execute instructions 402 contemporaneously. Although FIG. 4 shows multiple processors 404, the machine 400 may include a single processor with a single core, a single processor with multiple cores (e.g., a multi-core processor), multiple processors with a single core, multiple processors with multiple cores, or any combination thereof.

The memory 406 (e.g., a main memory or other memory storage) and the storage unit 408 are both accessible to the processors 404 such as via the bus 412. The memory 406 and the storage unit 408 store the instructions 402. The instructions 402 may also reside, completely or partially, within the memory 406, within the storage unit 408, within at least one of the processors 404 (e.g., within the processor's cache memory), or any suitable combination thereof, during execution thereof by the machine 400. Accordingly, the memory 406, the storage unit 408, and the memory of the processors 404 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 402. The term "machine-readable medium" shall also be taken to include any medium, or combination of multiple media, that is capable of storing instructions (e.g., instructions 402) for execution by a machine (e.g., machine 400), such that the instructions, when executed by one or more processors of the machine (e.g., processors 404), cause the machine to perform one or more operations that makes use of one or more of the methodologies described herein (e.g., the method 300). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 410 may include a wide variety of components to receive input, provide output, produce output, transmit information, exchange information, capture measurements, and so on. The specific I/O components 410 that are included in a particular machine 400 will depend on the type of the machine 400. For example, portable machines such as mobile phones will likely include a touch input device or other such input mechanisms, while a headless server machine will likely not include such a touch input device. It will be appreciated that the I/O components 410 may include many other components that are not specifically shown in FIG. 4. The I/O components 410 are grouped according to functionality merely for simplifying the following discussion and the grouping is in no way limiting. In various embodiments, the I/O components 410 may include input components 418 and output components 420. The input components 418 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 410 may include communication components 422 operable to couple the machine 400 to a network 424 or devices 426 via a coupling 428 and a coupling 430, respectively. For example, the communication components 422 may include a network interface component or another suitable device to interface with the network 424. In further examples, the communication components 422 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 426 may be another machine or any of a wide variety of peripheral devices. According to various embodiments, the communication components 422 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A network layer device, the network layer device being a first network layer device, the first network layer device comprising:
    an echo cancellation functional component configured to cancel echo of a transmitted data signal from a received data signal received from a second network layer device over a data transmission medium, the transmitted data signal being transmitted from the first network layer device to the second network layer device over the data transmission medium, the echo cancellation functional component being designed to support a nominal data rate at a nominal maximum cable length ($L_0$), over a cable with a nominal propagation delay time per unit length of the cable ($T_0$), and using a nominal clock frequency ($C_0$), as defined by a known network standard;
    an equalization functional component configured to at least reduce inter-symbol interference present in the received data signal, the equalization functional component being designed to support the nominal data rate defined by the known network standard; and
    a signal generation functional component designed to:
        support generation of a first transmit data signal for transmission of a first set of data frames at the nominal data rate defined by the known network standard, the signal generation functional component generating the first transmit data signal based on a first clock frequency and using a first data frame generation and a first signal modulation scheme, the first clock frequency, the first data frame generation, and the first signal modulation scheme being specified for the nominal data rate by the known network standard; and
        support generation of a second transmit data signal for transmission of a second set of data frames at an alternative data rate not defined by the known network standard, the alternative data rate being lower than the nominal data rate, the alternative data rate being at a maximal cable length (L) calculated by:

$$L = L_0 \cdot \frac{C_0 \cdot T_0}{C \cdot T},$$

where T represents a propagation delay time per unit length of the cable for the alternative data rate, and C represents a second clock frequency used for generating a transmit signal for the alternative data rate, the signal generation functional component generating the second transmit data signal based on the second clock frequency and using a second data frame generation and a second signal modulation scheme, the second clock frequency being different from the first clock frequency.

2. The network layer device of claim 1, wherein the second clock frequency is slower than the first clock frequency.

3. The network layer device of claim 1, wherein the first signal modulation scheme is Pulse Amplitude Modulation 4-level (PAM4).

4. The network layer device of claim 1, wherein the second signal modulation scheme is Pulse Amplitude Modulation 3-level (PAM3).

5. The network layer device of claim 1, wherein the nominal data rate is 10 Gbps.

6. The network layer device of claim 1, wherein the alternative data rate is 1 Gbps.

7. The network layer device of claim 1, comprising:
    a data frame generation functional component designed to:
    support the first data frame generation for transmission of the first set of data frames at the nominal data rate in accordance with the known network standard; and
    support the first data frame generation for transmission of the second set of data frames at the alternative data rate.

8. The network layer device of claim 1, wherein the known network standard comprises IEEE 802.3ch.

9. The network layer device of claim 1, wherein the data transmission medium comprises a cable in accordance with IEEE 802.3ch.

10. The network layer device of claim 9, wherein the nominal data rate is 10 Gbps, and wherein the alternative data rate is 1 Gbps.

11. The network layer device of claim 9, wherein the nominal data rate is 5 Gbps, and wherein the alternative data rate is 1 Gbps.

12. The network layer device of claim 9, wherein the nominal data rate is 2.5 Gbps, and wherein the alternative data rate is 1 Gbps.

13. The network layer device of claim 1, wherein the data transmission medium comprises a cable in accordance with an IEEE 802.3 bp network standard.

14. The network layer device of claim 13, wherein the nominal data rate is 10 Gbps, and wherein the alternative data rate is 2.5 Gbps.

15. The network layer device of claim 13, wherein the nominal data rate is 10 Gbps, and wherein the alternative data rate is 5 Gbps.

16. The network layer device of claim 13, wherein the nominal data rate is 5 Gbps, and wherein the alternative data rate is 2.5 Gbps.

17. The network layer device of claim 1, wherein the first network layer device is a physical network layer device that implements at least one of a media access controller (MAC) layer or a physical (PHY) layer.

18. A method comprising:
configuring a first network layer device to operate at an alternative data rate, the first network layer device comprising:
an echo cancellation functional component configured to cancel echo of a transmitted data signal from a received data signal received from a second network layer device over a data transmission medium, the transmitted data signal being transmitted from the first network layer device to the second network layer device over the data transmission medium, the echo cancellation functional component being designed to support a nominal data rate at a nominal maximum cable length ($L_0$), over a cable with a nominal propagation delay time per unit length of the cable ($T_0$), and using a nominal clock frequency ($C_0$), as defined by a known network standard;
an equalization functional component configured to at least reduce inter-symbol interference present in the received data signal, the equalization functional component being designed to support the nominal data rate defined by the known network standard; and
a signal generation functional component designed to:
support generation of a first transmit data signal for transmission of a first set of data frames at the nominal data rate defined by the known network standard, the signal generation functional component generating the first transmit data signal based on a first clock frequency and using a first data frame generation and a first signal modulation scheme, the first clock frequency, the first data frame generation, and the first signal modulation scheme being specified for the nominal data rate by the known network standard; and
support generation of a second transmit data signal for transmission of a second set of data frames at an alternative data rate not defined by the known network standard, the alternative data rate being lower than the nominal data rate, the alternative data rate being at a maximal cable length (L) calculated by:

$$L = L_0 \cdot \frac{C_0 \cdot T_0}{C \cdot T},$$

where T represents a propagation delay time per unit length of the cable for the alternative data rate, and C represents a second clock frequency used for generating a transmit signal for the alternative data rate, the signal generation functional component generating the second transmit data signal based on the second clock frequency and using a second data frame generation and a second signal modulation scheme, the second clock frequency being different from the first clock frequency;
establishing, by the first network layer device, a data link between the first network layer device and a second network layer device over the data transmission medium, data being communicated over the data link in a first direction from the first network layer device to the second network layer device is at the alternative data rate; and
transmitting, by the first network layer device, the second set of data frames over the data link using the echo cancellation functional component, the equalization functional component, and the second signal modulation scheme.

19. The method of claim 18, wherein data is communicated over the data link in a second direction from the second network layer device to the first network layer device using the alternative data rate.

20. The method of claim 18, wherein the second clock frequency is slower than the first clock frequency.

* * * * *